2,925,353
SOLUTIONS OF ORGANIC ACID ESTERS OF CELLULOSE

John P. Mika, Westfield, and Harold K. Hughes, Summit, N.J., assignors to Celanese Corporation of America, New York, N.Y., a corporation of Delaware No Drawing. Application August 18, 1954
Serial No. 450,800

11 Claims. (Cl. 106—198)

This invention relates to the preparation of solutions of organic acid esters of cellulose and relates more particularly to an improved process for the production of concentrated solutions of organic acid esters of cellulose having a high degree of substitution.

When acid esters of cellulose having a high degree of substitution are dissolved in suitable solvents, it is found that the properties of the solutions obtained are not completely satisfactory. For example, the solutions are "grainy" in that they do not appear to be completely homogeneous although the organic acid ester of cellulose is fully dissolved. They also have extremely high viscosities and tend to plug a filtering element quite rapidly. When solutions of this character are employed for the production of filaments, it is found that the spinning of said solutions is not stable, resulting in the production of filaments whose properties vary over an excessively wide range and, in extreme cases, in the breakage of the filaments.

It is an important object of this invention to provide a process for the production of solutions of organic acid esters of cellulose having a high degree of substitution which will be free from the foregoing and other disadvantages.

Another object of this invention is to provide a process for the production of solutions of organic acid esters of cellulose having a high degree of substitution by subjecting said solutions during their preparation to a vigorous shearing action.

Other objects of this invention will be apparent from the following detailed description and claims.

According to the present invention it has been found that the properties of solutions formed by dissolving organic acid esters of cellulose having a high degree of substitution in suitable solvents may be greatly improved by subjecting said solutions to a vigorous shearing action. The solutions which have been treated in this manner exhibit a smooth homogeneous appearance and a lower viscosity whereby they may be handled readily at high concentrations without involving the use of excessive pressures. These solutions are also more readily filtered than solutions that have not been subjected to such shearing action and exhibit a considerably smaller tendency to plug the filtering elements. On spinning these solutions there is no evidence of spinning instability so that filaments prepared therefrom exhibit properties varying over only a limited range and there is no tendency toward filament breakage during the spinning operation. The properties of the filaments produced are also definitely superior.

The organic acid esters of cellulose to which this invention is applicable are those having fewer than about 0.4 free hydroxyl groups or preferably fewer than about 0.2 free hydroxyl groups per anhydroglucose unit in the cellulose molecule. Particularly good results are obtained with celluose acetate having an acetyl value of above about 58% by weight or preferably above about 60% by weight. Good results may also be obtained with other organic acid esters of cellulose including cellulose propionate and cellulose butyrate, as well as with the mixed esters, including cellulose acetate formate, celluose acetate propionate and cellulose acetate butyrate, in which esters and mixed esters the number of free hydroxyl groups is within the range specified.

While any of a large number of materials may be employed as solvents for forming these solutions including trichloromethane, formic acid and meta-cresol, particularly good results are obtained by employing as solvents methylene chloride, and mixtures of methylene chloride with lower aliphatic alcohols such as methanol ethanol, normal propanol, isopropanol and the butanols. With these solvents there are obtained solutions that are especially well suited for the production of filaments by conventional spinning operations. The concentration of organic acid ester of cellulose in the solution may vary over a relatively wide range depending on the use to which the solution is to be put. The process of this invention is, however, particularly advantageous when it is applied to solutions whose concentrations are quite high, exceeding about 12% by weight, or preferably exceeding about 15% by weight, based on the weight of the solution. Measured differently, the solutions to which this invention is particularly applicable are those having viscosities above about 100 poise or preferably above about 300 poise. At such high concentrations and viscosities, the problems previously outlined become especially severe and the advantages obtained through the use of this process become correspondingly great.

In applying the process of this invention, the solutions are subjected to a shearing action in which the rate of shear is at least about 20 or preferably about 60 reciprocal seconds. The time of treatment of the solutions in an apparatus equipped with paddle or similar impellers will depend on the rate of shear and dimensions of the apparatus and may range from as little as about 30 minutes when high rates of shear are employed to as high as about 12 hours when low rates of shear at or above the minimum specified, are employed. For best results the treatment should normally be continued until such time as treatment for an additional 0.5 hours will cause a drop in viscosity of less than about 5%. The time of treatment will also depend on the nature of the apparatus employed, longer treating times being necessary when the treatment is carried out in an apparatus in which only a small proportion of the solution is subjected to shear at any given time and shorter treating times being necessary as the percentage of the solution subjected to shear at any given time increases. In general, the integrated shear, i.e., the rate of shear multiplied by the time of treatment, should be at least about 36,000. The rate of shear and the integrated shear are both measured in terms of centimeters and seconds.

Any suitable type of mixing apparatus may be employed for carrying out the treatment of the solutions. Thus, the solution may be passed through a mixer equipped with a paddle type impeller operated at speeds sufficiently high to give the desired rate of shear. The paddles of the paddle type impeller may, if desired, be provided with a plurality of small openings therein whereby a larger volume of the solution being treated is continuously being subjected to high shear rates. The solution may also be passed through a homogenizing mill or it may be treated with sonic energy to develop the required degree of shear therein.

The following example is given to illustrate this invention further.

Example

A solution is prepared by tumbling for 8 hours a cellulose acetate having an acetyl value of 62.5% by weight together with a sufficient quantity of a solvent containing 92 parts by weight of methylene chloride and 8 parts by weight of methanol to yield a cellulose acetate concentration of 18.4% by weight based on the weight of the solution. The solution so prepared has a viscosity of 490 poises measured on a Brookfield viscometer at 25° C. and 10 r.p.m. The solution so prepared is then introduced into a paddle type stirrer the impeller of which operates at 1700 r.p.m. to give a high shear rate of about 65 reciprocal seconds throughout the entire volume of the solution and stirring is continued for 15 minutes. The viscosity of the stirred solution drops to 400 poise. The initial rate of filtration of the stirred solution through a standard filter is 47.5% greater than the unstirred solution. The total volume of solution that may be forced through said filter at a given pressure before it plugs is 10.7 times as great as that in the case of the unstirred solution.

On extending the stirring to 60 minutes the viscosity drops to 370 poises. The initial rate of filtration is 70% greater than that of the unstirred solutions and the total volume of solution that may be forced through said filter at a given pressure before it plugs is 21.5 times as great as that of the unstirred solution.

The acetyl values given herein are calculated as acetic acid.

It is to be understood that the foregoing detailed description is given merely by way of illustration and that many variations may be made therein without departing from the spirit of our invention.

Having described our invention what we desire to secure by Letters Patent is:

1. Process for the production of solutions of organic acid esters of cellulose having fewer than about 0.4 free hydroxyl groups per anhydroglucose unit in the cellulose molecule, which comprises dissolving said organic acid esters of cellulose in a solvent therefor, and reducing the viscosity of the solution so formed and increasing the filterability and spinnability thereof by subjecting a body of the solution so formed to a rate of shear of at least about 20 reciprocal seconds applied by a moving member passing through said body for a period between 30 minutes and 12 hours.

2. Process for the production of solutions of cellulose acetate having an acetyl value of at least about 58% by weight, which comprises dissolving said cellulose acetate in a solvent therefor, and reducing the viscosity of the solution so formed and increasing the filterability and spinnability thereof by subjecting a body of the solution so formed to a rate of shear of at least about 20 reciprocal seconds applied by a moving member passing through said body for a period between 30 minutes and 12 hours.

3. Process for the production of solutions of cellulose acetate having an acetyl value of at least about 58% by weight, which comprises dissolving said cellulose acetate in a solvent selected from the groups consisting of methylene chloride and mixtures of methylene chloride and lower aliphatic alcohols, and reducing the viscosity of the solution so formed and increasing the filterability and spinnability thereof by subjecting a body of the solution so formed at a rate of shear of at least about 20 reciprocal seconds applied by a moving member passing through said body for a period between 30 minutes and 12 hours.

4. Process for the production of solutions of cellulose acetate having an acetyl value of at least about 58% by weight, which comprises dissolving said cellulose acetate in a solvent selected from the group consisting of methylene chloride and mixtures of methylene chloride and lower aliphatic alcohols, to form a solution having a viscosity of at least about 100 poise, and reducing the viscosity of the solution so formed and increasing the filterability and spinnability thereof by subjecting a body of the solution so formed to a rate of shear of at least about 20 reciprocal seconds applied by a moving member passing through said body for a period between 30 minutes and 12 hours.

5. Process for the production of solutions of cellulose acetate having an acetyl value of at least about 58% by weight, which comprises dissolving said cellulose acetate in a solvent therefor, to form a solution having a cellulose acetate concentration of at least about 12% by weight based on the weight of the solution, and reducing the viscosity of the solution so formed and increasing the filterability and spinnability thereof by subjecting a body of the solution so formed at a rate of shear of at least about 20 reciprocal seconds applied by a moving member passing through said body for a period between 30 minutes and 12 hours.

6. Process for the production of solutions of cellulose acetate having an acetyl value of at least about 58% by weight, which comprises dissolving said cellulose acetate in a solvent selected from the group consisting of methylene chloride and mixtures of methylene chloride and lower aliphatic alcohols, to form a solution having a cellulose acetate concentration of at least about 12% by weight based on the weight of the solution, and reducing the viscosity of the solution so formed and increasing the filterability and spinnability thereof by subjecting a body of the solution so formed to a rate of shear of at least about 20 reciprocal seconds applied by a moving member passing through said body for a period between 30 minutes and 12 hours.

7. Process for the production of solutions of cellulose acetate having an acetyl value of at least about 60% by weight, which comprises dissolving said cellulose acetate in a solvent selected from the group consisting of methylene chloride and mixtures of methylene chloride and lower aliphatic alcohols, to form a solution having a cellulose acetate concentration of at least about 15% by weight based on the weight of the solution, and reducing the viscosity of the solution so formed and increasing the filterability and spinnability thereof by subjecting a mass consisting essentially of said solution so formed to an integrated shear of at least about 36,000 at a rate of shear of at least about 50 reciprocal seconds while simultaneously mixing said solution.

8. Process for the production of solutions of organic acid esters of cellulose having fewer than about 0.4 free hydroxyl groups per anhydroglucose unit in the cellulose molecule, which comprises dissolving said organic acid esters of cellulose in a solvent therefor, and reducing the viscosity of the solution so formed and increasing the filterability and spinnability thereof by subjecting a body of the solution so formed to a rate of shear of at least about 20 reciprocal seconds for a period of time which is between 30 minutes and 12 hours and such that treatment for an additional 0.5 hours causes a drop in viscosity of the solution of less than about 5%.

9. Process for the production of solutions of organic acid esters of cellulose having fewer than about 0.4 free hydroxyl groups per anhydroglucose unit in the cellulose molecule, which comprises dissolving said organic acid ester of cellulose in a solvent therefor, reducing the viscosity of the solution so formed and increasing the filterability and spinnability thereof by maintaining a body of the solution so formed and subjecting said body for a period between 30 minutes and 12 hours to a treatment which comprises passing a moving member through said body to apply shear to a portion of said body at a rate of at least about 20 reciprocal seconds while said portion is surrounded by other portions of said body and permitting said sheared portion of said body to blend with surrounding portions of said body.

10. Process for the production of solutions of cellulose acetate having an acetyl value of at least about 50% by weight, which comprises dissolving said cellulose acetate in a solvent selected from the groups consisting of methylene chloride and mixtures of methylene chloride and lower aliphatic alcohols, and reducing the viscosity of the solution so formed and increasing the filterability and spinnability thereof by maintaining a body of the solution so formed and subjecting said body for a period between 30 minutes and 12 hours to a treatment which comprises passing a moving member through said body to apply shear to a portion of said body at a rate of at least about 20 reciprocal seconds while said portion is surrounded by other portions of said body and permitting said sheared portion of said body to blend with surrounding portions of said body.

11. Process for the production of solutions of cellulose acetate having an acetyl value of at least about 58% by weight, which comprises dissolving said cellulose acetate in a solvent selected from the group consisting of methylene chloride and mixtures of methylene chloride and lower aliphatic alcohols, to form a solution having a cellulose acetate concentration of at least about 12% by weight based on the weight of the solution and reducing the viscosity of the solution so formed and increasing the filterability and spinnability thereof by maintaining a body of the solution so formed and subjecting said body for a period between 30 minutes and 12 hours to a treatment which comprises passing a moving member through said body to apply shear to a portion of said body at a rate of at least about 20 reciprocal seconds while said portion is surrounded by other portions of said body and permitting said sheared portion of said body to blend with surrounding portions of said body.

References Cited in the file of this patent

UNITED STATES PATENTS

| | | |
|---|---|---|
| 2,526,598 | Barrett et al. | Oct. 17, 1850 |
| 2,045,161 | Muller et al. | June 23, 1936 |
| 2,336,310 | Spence et al. | Dec. 7, 1943 |
| 2,346,350 | Berl et al. | Apr. 11, 1944 |
| 2,353,991 | Bontwell | July 18, 1944 |
| 2,396,752 | Roddy | Mar. 19, 1946 |
| 2,419,035 | Quinn et al. | Apr. 15, 1947 |
| 2,596,656 | Crane | May 13, 1952 |

OTHER REFERENCES

Ott et al.: High Polymers, volume V, part III, page 1088 (1954).

Hercules "Cellulose Acetate," Hercules Powder Co., Wilmington 99, Del., page 10.